(12) United States Patent
Ochi

(10) Patent No.: US 11,518,094 B2
(45) Date of Patent: Dec. 6, 2022

(54) THREE-DIMENSIONAL SHAPED OBJECT PRODUCTION METHOD AND PRODUCTION DEVICE

(71) Applicant: MIMAKI ENGINEERING CO., LTD., Nagano (JP)

(72) Inventor: Kazuhiro Ochi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 26 days.

(21) Appl. No.: 15/781,147

(22) PCT Filed: Dec. 8, 2016

(86) PCT No.: PCT/JP2016/086492
§ 371 (c)(1),
(2) Date: Jun. 4, 2018

(87) PCT Pub. No.: WO2017/099163
PCT Pub. Date: Jun. 15, 2017

(65) Prior Publication Data
US 2018/0354193 A1    Dec. 13, 2018

(30) Foreign Application Priority Data
Dec. 11, 2015  (JP) .............................. JP2015-242714

(51) Int. Cl.
*B29C 64/209* (2017.01)
*B33Y 10/00* (2015.01)
(Continued)

(52) U.S. Cl.
CPC .......... *B29C 64/209* (2017.08); *B29C 64/112* (2017.08); *B29C 64/35* (2017.08);
(Continued)

(58) Field of Classification Search
CPC ..... B29C 64/209; B29C 64/35; B29C 64/393; B29C 64/112; B33Y 50/02; B33Y 30/00; B33Y 10/00
See application file for complete search history.

(56) References Cited

U.S. PATENT DOCUMENTS

2002/0085057 A1*  7/2002  Endo ...................... B41J 2/2139
                                                    347/19
2004/0175451 A1*  9/2004  Maekawa ............... B29C 41/46
                                                    425/375

FOREIGN PATENT DOCUMENTS

JP    2001334582    *  12/2001    ............. B29C 67/00
JP    2012071611       4/2012

OTHER PUBLICATIONS

English translation of JP 2001334582 (Year: 2001).*

(Continued)

*Primary Examiner* — Timothy Kennedy
*Assistant Examiner* — Olukorede Esan
(74) *Attorney, Agent, or Firm* — JCIPRNET

(57) ABSTRACT

A nozzle check suitable for production of a three-dimensional shaped object is performed. A production method of a three-dimensional shaped object M configured to laminate unit layers (L1, L2, . . . ), in which a nozzle checking step inspects at least a part of nozzles (6) for ejecting ink for forming a particular unit layer, which is performed after having started production in a case where a timing of the nozzle check is before forming the particular unit layer and this unit layer is a lowermost layer (L1), and is performed after having formed a unit layer that is located directly under the particular unit layer in a case where the timing of the nozzle check is before forming the particular unit layer and this layer is not the lowermost layer (L1).

6 Claims, 2 Drawing Sheets

(51) Int. Cl.
*B33Y 30/00* (2015.01)
*B33Y 50/02* (2015.01)
*B29C 64/112* (2017.01)
*B29C 64/393* (2017.01)
*B29C 64/35* (2017.01)

(52) U.S. Cl.
CPC ............ *B29C 64/393* (2017.08); *B33Y 10/00* (2014.12); *B33Y 30/00* (2014.12); *B33Y 50/02* (2014.12)

(56) References Cited

OTHER PUBLICATIONS

"International Search Report (Form PCT/ISA/210) of PCT/JP2016/086492", dated Feb. 28, 2018, with English translation thereof, pp. 1-2.

* cited by examiner

THREE-DIMENSIONAL SHAPED OBJECT PRODUCTION METHOD AND PRODUCTION DEVICE

CROSS-REFERENCE TO RELATED APPLICATION

This application is a 371 application of the International PCT application serial no. PCT/JP2016/086492, filed on Dec. 8, 2016, which claims the priority benefits of Japan Patent Application No. 2015-242714, filed on Dec. 11, 2015. The entirety of each of the above-mentioned patent applications is hereby incorporated by reference herein and made a part of this specification.

TECHNICAL FIELD

The disclosure relates to a production method and a production apparatus for a three-dimensional shaped object.

BACKGROUND ART

Patent Document 1 describes a 3D printing apparatus which forms a 3D (: Three Dimensions) model using a print head having at least one row of inkjet nozzles for injecting a border material.

CITATION LIST

Patent Literature

Patent Literature 1: Japanese Unexamined Patent Publication No. 2012-71611

SUMMARY OF DISCLOSURE

Technical Problems

Patent Document 1 relates to a technique that suppresses an influence of a nozzle in which nozzle clog is occurring by preventing a same nozzle from striking a same position in each layer of a laminated body, in which a dot position where the nozzle is missing by identifying a position where ejection forming is performed using a sensor is determined.

However, with a conventional technique as in Patent Document 1, if a head position is to be controlled while detecting the position of the missing nozzle in each laminated layer every time, control thereof becomes complicated, and it is not suitable for performing nozzle check while producing a three-dimensional shaped object.

In order to produce a three-dimensional shaped object, a total ejection amount or a frequency of use differs greatly for each type of ink, such as modeling material ink, support material ink, and coloring material ink. Although the modeling material ink will be used in large amounts, there are cases of using and not using a support material depending on a structure of the three-dimensional shaped object, and even in the case of using the support material, a portion where the support material is used is normally limited. Further, in a case of producing a colored three-dimensional shaped object, color ink and transparent ink used for printing on a surface of a modeling material has a small frequency of use. Due to this, this may become a cause affecting susceptibility to ejection failures due to their frequency of use. Further, ink such as the color ink of which frequency of use is small easily thickens, and tends to generate nozzle clogs easily. Further, in a case of producing a three-dimensional shaped object using light-curing ink such as ultraviolet curing ink, light for curing needs to be irradiated continuously. However, as compared to a case of printing on a two-dimensional print medium using same ink, since the three-dimensional shaped object has height, a distance from a light source to an irradiation target object is long, and a distance for the light to be reflected is long. Further, since the three-dimensional shaped object comes to have increased irregular patterns on its surface as the shaping progresses, a head surface and a reflection surface including an ink-striking surface have different distances from those of the two-dimensional print medium depending on a position and a layering number of times. Due to this, diffused reflection tends to occur more easily as compared to the case of printing on the two-dimensional print medium. When the diffused light reaches the nozzles, the ink thickens and hardens, which causes clogs to occur more frequently. Thus, even if all the nozzles are inspected uniformly prior to starting lamination, a nozzle with a low frequency has a higher possibility of having become an abnormal nozzle by its ejection timing.

The disclosure is a disclosure made in view of the above problem, and provides a production method of a three-dimensional shaped object which performs a nozzle check suitable for production of the three-dimensional shaped object.

Solutions to the Problems

To solve the above problem, the inventor has conducted keen studies, as a result of which the disclosure as follows has been achieved.

A production method of a three-dimensional shaped object according to the disclosure is a production method of a three-dimensional shaped object configured to laminate unit layers, each of the unit layers is formed by droplets ejected from nozzles provided in a head, the method including a nozzle checking step of inspecting the nozzles, the nozzle checking step includes performing a nozzle check on at least a part of the nozzles that eject the droplets for forming a particular unit layer as an inspection target, wherein the nozzle check is performed after having started production in a case where a timing of the nozzle check is before forming the unit layer and the unit layer is a lowermost layer, and is performed after having formed a unit layer that is located directly under the unit layer in a case where the timing of the nozzle check is before forming the unit layer and the unit layer is not the lowermost layer.

A production apparatus of a three-dimensional shaped object according to the disclosure is a production apparatus of a three-dimensional shaped object configured to laminate unit layers, each of the unit layers is formed by droplets ejected from nozzles provided in a head, the apparatus including: a nozzle inspection unit configured to inspect the nozzles; and a nozzle check controller configured to control the nozzle inspection unit, wherein the nozzle check controller performs control to perform a nozzle check on at least a part of the nozzles that eject the droplets for forming a particular unit layer as an inspection target, wherein the nozzle check is performed after having started production in a case where a timing of the nozzle check is before forming the unit layer and the unit layer is a lowermost layer, and is performed after having formed a unit layer that is located directly under the unit layer in a case where the timing of the nozzle check is before forming the unit layer and the unit layer is not the lowermost layer.

According to the above configuration, when the three-dimensional shaped object is to be produced, the inspection can be performed for each nozzle that ejects the droplets at timings closer to immediately before when the nozzle is to be used. Even if all the nozzles are uniformly inspected before starting the lamination, a nozzle with a low frequency has a possibility of having become an abnormal nozzle by its ejection timing. However, according to the above configuration, influences of occurrences of abnormal nozzles caused by differences in frequencies of use can effectively be detected. Accordingly, a nozzle check suitable for the production of the three-dimensional shaped object can be performed.

In the production method of a three-dimensional shaped object according to the disclosure, nozzle rows in each of which one or more of the nozzles are arranged along a certain direction are provided, and a type of the droplets to be ejected is different for each of the nozzle rows, and the nozzle checking step more preferably performs the nozzle check of a nozzle row including the inspection target nozzle.

According to the above configuration, even if an ejection amount and a frequency of use differ greatly among the nozzle rows, an occurrence of failures in the nozzles caused by an influence thereof can effectively be detected.

In the production method of a three-dimensional shaped object according to the disclosure, in the nozzle checking step, the nozzle check is more preferably performed on a nozzle that is to be used for a first time after having started the production in forming the particular unit layer as the inspection target.

According to the above configuration, only the nozzle that has not been used for unit layers formed prior to the particular unit layer and is used for the first time in forming the particular unit layer is inspected, by which a number of the nozzles to be inspected can be reduced. As a result, a nozzle inspection time can be shortened, and a time until forming a subsequent unit layer can be shortened.

In the production method of a three-dimensional shaped object according to the disclosure, in the nozzle checking step, at least a preset part of the nozzles provided in the head are more preferably subjected to the nozzle check at least in one of occasions, which are every time a preset number of unit layers are formed, and in a preset time.

According to the above configuration, the nozzle check is performed periodically, so that even if an ejection failure occurs in a nozzle after a previous inspection has been performed, such a failure can be detected.

In the production method of a three-dimensional shaped object according to the disclosure, in the nozzle checking step, a preset plurality of nozzles among the nozzles provided in the head are configured as one group, and based on group information that divides at least a part of the nozzles provided in the head into a plurality of groups, the nozzle check of a part of the plurality of groups is more preferably performed every time a preset number of unit layers are formed.

When all the nozzles are inspected every time a certain number of unit layers are formed, the nozzle check becomes time-consuming, and a standby time until forming a subsequent unit layer on a surface of a unit layer that has been formed immediately before becomes long. As a result, a state of the surface of the unit layer that has been formed immediately before and a state of a surface with another unit layer become different in regard to their drying states and wettability, and there is a risk that the surface of the unit layer that has been formed immediately before comes to be in an unsatisfactory state. Thus, according to the above configuration, the nozzle check is performed by group divisions, so that the time until forming the subsequent unit layer can be shortened. Due to this, the time from when the particular unit layer has been formed until forming the subsequent unit layer can further be uniformized throughout a period for producing the three-dimensional shaped object. Due to this, the surfaces of the unit layers can be brought to a more uniformized state to form their subsequent layers, and a highly precise three-dimensional shaped object can be produced.

In the nozzle checking step, at least one of a nozzle that has not ejected the droplets for a preset number of times and a nozzle that has not ejected the droplets at a preset amount within a period until forming a preset number of unit layers after having formed the particular unit layer or within a preset time is more preferably subjected to the nozzle check and/or flushing.

There is a risk that a nozzle may come to be in a non-ejectable state due to its nonfrequent operating state. According to the above configuration, by performing the nozzle check on the nozzle with the nonfrequent operating state, even if this nozzle is in the non-ejectable state, such state of the nozzle that is not able to eject can be identified. Since an occurrence of an abnormal nozzle is less for a nozzle with a frequent operating state, the nozzle inspection time can be shortened by performing the check only on the nozzle with the nonfrequent operating state. Further, by performing the flushing on the nozzle with the nonfrequent operating state, thickening in this nozzle can be suppressed.

The production apparatus of a three-dimensional shaped object according to the disclosure more preferably further includes a supporting stage that supports the three-dimensional shaped object, and a position controller that enables at least one of the nozzle inspection unit, the supporting stage, and the head to move in a laminating direction, where the position controller performs control such that a difference in a distance between the nozzle inspection unit and a droplet ejection surface of the head stays within a preset length even in a case where at least one of the supporting stage and the head moves in the laminating direction.

According to the above configuration, even if the head or the supporting stage moves in the laminating direction, the distance between the nozzle inspection unit and the surface of the head for ejecting the droplets stays substantially constant, as a result of which a distance between a region where the falling droplets pass through, which is a region targeted for the inspection by the nozzle inspection unit, and the ejection surface becomes substantially constant at all times. Thus, an error in the nozzle inspection caused by the head or the supporting stage moving in the laminating direction does not occur.

Effect of the Disclosure

The disclosure achieves the effect of being able to perform a nozzle check that is suitable for a production of a three-dimensional shaped object.

DESCRIPTION OF EMBODIMENT

<Production Method of Three-Dimensional Shaped Object>

[An Embodiment of the Production Method of a Three-Dimensional Shaped Object According to the Disclosure]

Figure 1:
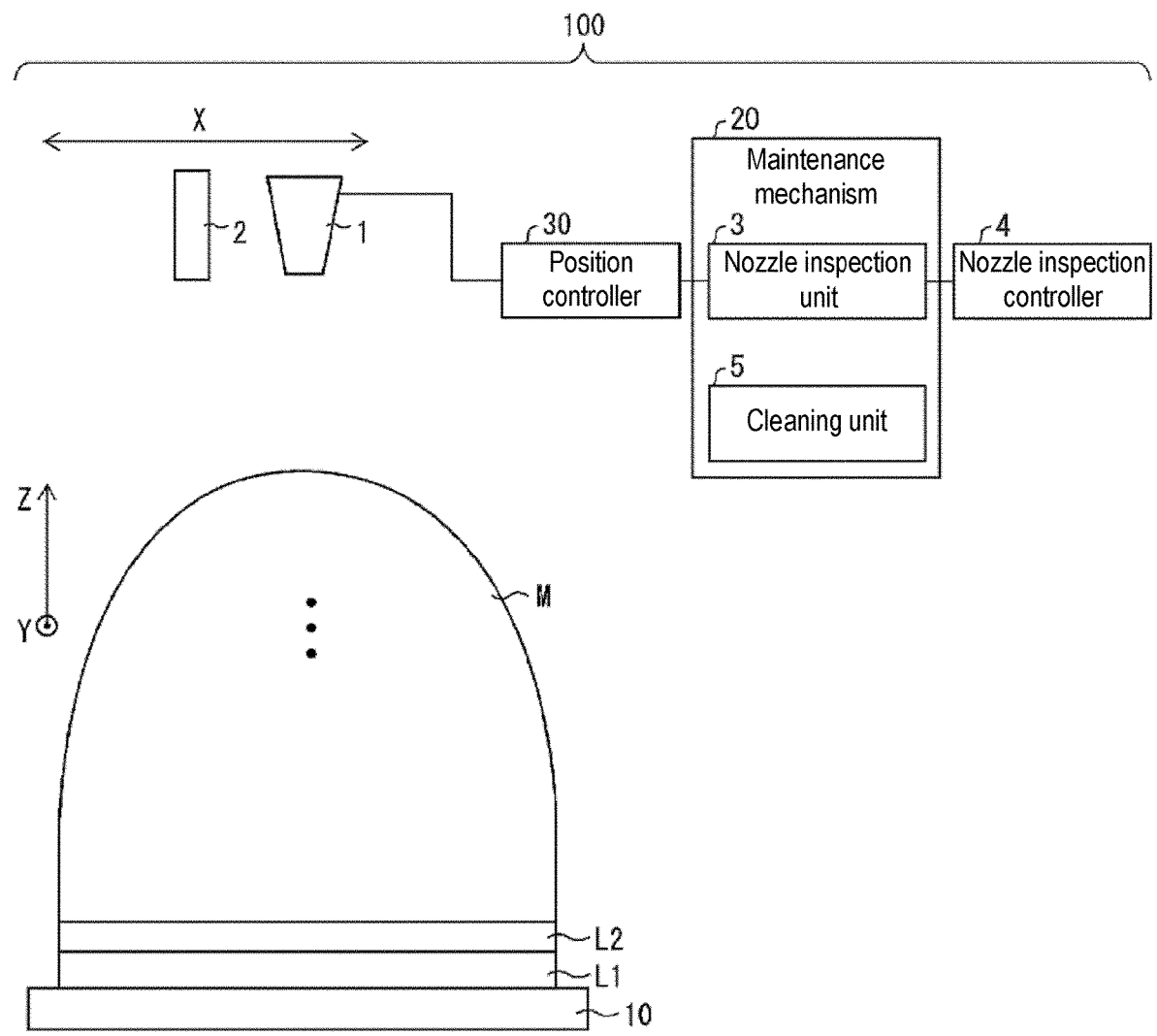
FIG. 1 is a diagram schematically illustrating a procedure of producing a three-dimensional shaped object M using a printing apparatus 100, which is an embodiment of a production method of a three-dimensional shaped object according to the disclosure.
Figure 2:
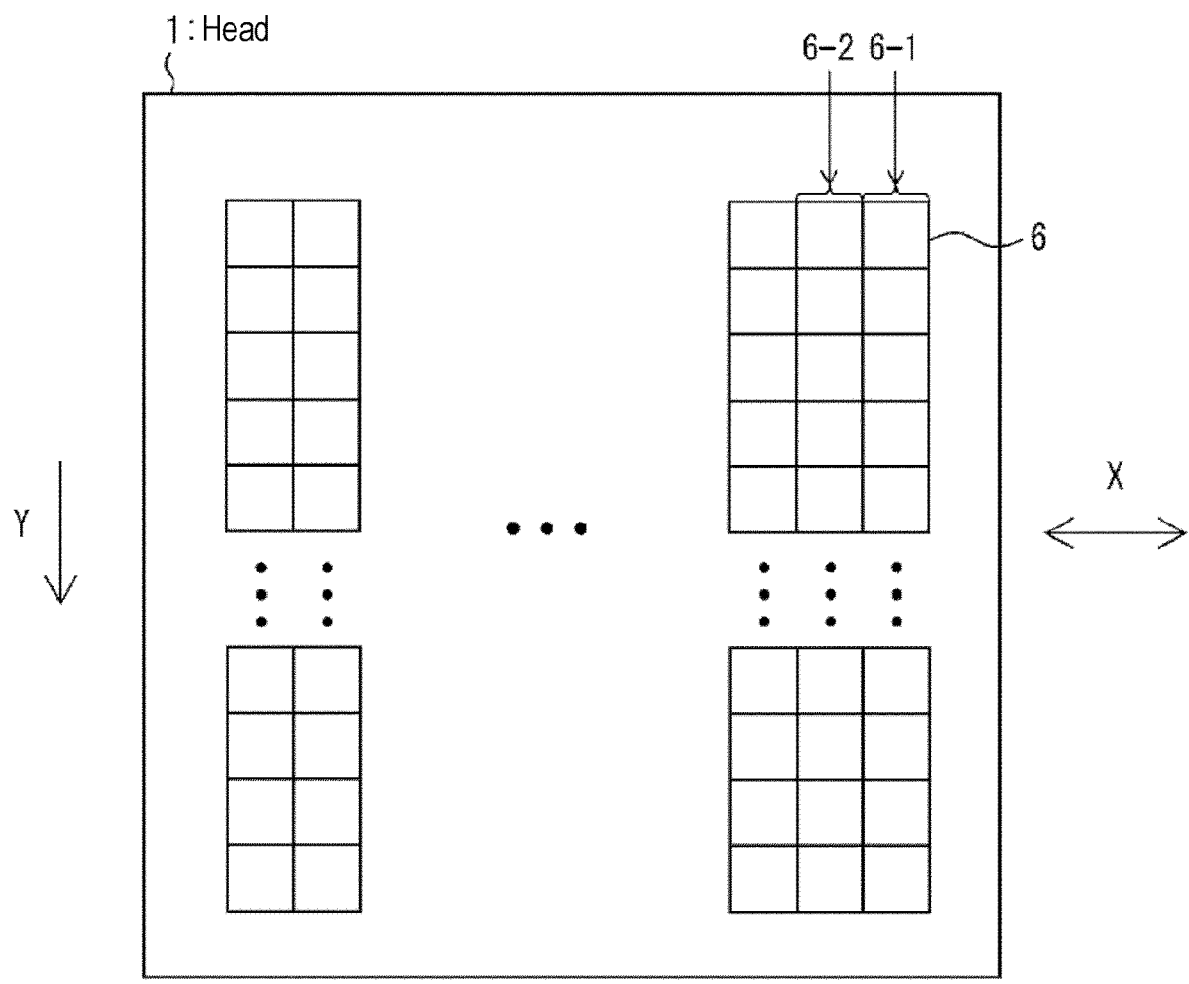
FIG. 2 is a diagram schematically illustrating a schematic configuration of a head 1 in the printing apparatus 100 used in the embodiment of the production method of a three-dimensional shaped object according to the disclosure.

An embodiment of the production method of a three-dimensional shaped object according to the disclosure will be described using FIGS. 1 and 2. FIG. 1 is a diagram schematically illustrating a procedure of producing a three-dimensional shaped object M using a printing apparatus 100, which is an embodiment of the production method of a three-dimensional shaped object according to the disclosure. FIG. 2 is a diagram schematically illustrating a schematic configuration of a head 1 in the printing apparatus 100 used in the embodiment of the production method of a three-dimensional shaped object according to the disclosure. It should be noted that FIG. 1 is also a cross sectional diagram of a plane of the three-dimensional shaped object M vertical to a surface of a supporting stage 10.

In the present embodiment, a case of producing the three-dimensional shaped object M by an inkjet method using ultraviolet curing ink will be described.

It should be noted that although the ultraviolet curing ink is used in the present embodiment, ink used in the production method of a three-dimensional shaped object according to the disclosure is not limited to this configuration. In the production method of a three-dimensional shaped object according to the disclosure, any ink may be selected according to purposes of the three-dimensional shaped object to be produced. For example, conventionally well-known modeling material ink may suitably be employed.

As specific types of the ink, the ultraviolet curing ink and thermoplastic ink may be exemplified. Among such, the ultraviolet curing ink is more preferable. The ultraviolet curing ink can easily be cured in a short time period, so that unit layers can be formed in a short time period. Further, since it can easily be laminated, so the three-dimensional shaped object can be produced in a shorter time period.

The ultraviolet curing ink contains an ultraviolet curing compound. The ultraviolet curing compound is not limited, so long as it is a compound that cures upon ultraviolet irradiation. As the ultraviolet curing compound, curable monomers and curable oligomers that polymerize by the ultraviolet irradiation may be exemplified. As the curable monomers, low-viscosity acrylic monomers, vinyl ethers, oxetane-based monomers, and cyclic fatty epoxy monomers may be exemplified. As the curable oligomers, acrylic oligomers may be exemplified.

It should be noted that in a case where there is an overhanging portion in the three-dimensional shaped object to be produced, conventionally well-known support material ink may suitably be used.

As illustrated in FIG. 1, the printing apparatus 100 includes a head 1, UV (: Ultraviolet)-LED (: Light Emitting Diode) lamp 2, a maintenance mechanism 20, a nozzle inspection controller 4 being a nozzle check controller, a position controller 30, and a supporting stage 10. The maintenance mechanism 20 includes a nozzle inspection unit 3 and a cleaning unit 5.

Further, as illustrated in FIG. 1, the three-dimensional shaped object M is formed by laminating a plurality of unit layers, such as unit layers L1, L2, and so on.

(Head 1)

The head 1 is an inkjet head for ejecting ink that is in a form of droplets. The head 1 scans over the supporting stage 10 while reciprocating in an X direction. By ejecting the ink while scanning, it forms a unit layer by ejecting the ink on the supporting stage 10 or on a previously produced unit layer.

It should be noted that the head 1 used in the production method of a three-dimensional shaped object according to the disclosure may be a conventionally well-known head. For example, an inkjet head that ejects droplets using oscillation of piezoelectric elements, an inkjet head that forms ink droplets by mechanical deformation of electrostrictive elements, and an inkjet head that uses thermal energy may be exemplified.

Further, in the present embodiment, a configuration will be described in which an ejection target unit does not move and the head 1 moves when the head 1 scans over the supporting stage 10 in the X direction. However, the production method of a three-dimensional shaped object according to the disclosure is not limited to this configuration, and a production apparatus in which a head and an ejection target unit move relatively may be used.

(Nozzles 6)

Nozzles 6 eject the ink. As illustrated in FIG. 2, the head 1 includes nozzle rows 6-1, 6-2, . . . , each of which is configured of one or more nozzle(s) 6 aligned along a sub scanning direction, which is a Y direction. Further, all the nozzles 6 belong to one of the nozzle rows. In other words, the nozzles 6 are grouped into groups configured by the nozzle rows. It should be noted that the sub scanning direction is a direction that intersects perpendicularly to a main scanning direction being the X direction.

Here, the ink to be ejected from each of the nozzle rows 6-1, 6-2, . . . includes modeling material ink, support material ink, and coloring material ink, and types thereof are different. In other words, all the nozzles of each nozzle row eject the same type of ink.

(UV-LED Lamp 2)

The UV-LED lamp 2 is a device that irradiates the ultraviolet curing ink ejected from the head 1 with ultraviolet light.

It should be noted that in the case of using the ultraviolet curing ink in the production method of a three-dimensional shaped object according to the disclosure, the device for irradiating light is not limited to this configuration, and various other conventionally well-known devices capable of irradiating ultraviolet light may be employed.

(Maintenance Mechanism 20)

The maintenance mechanism 20 includes the nozzle inspection unit 3 and the cleaning unit 5. The maintenance mechanism 20 can house the head 1. Further, it inspects the housed head 1 using the nozzle inspection unit 3, and cleans the same using the cleaning unit 5. The maintenance mechanism 20 is provided at an end along a moving direction of the head 1, away from a range where the head 1 scans.

(Nozzle Inspection Unit 3)

The nozzle inspection unit 3 is for inspecting the nozzles 6.

In the present embodiment, an "ejection-failed nozzle" refers to a nozzle from which an appropriate ink ejection can no longer be performed due to causes such as ink clogs.

It should be noted that the nozzle inspection unit 3 used in the production method of a three-dimensional shaped object according to the disclosure may be conventionally well-known ones, and in the present embodiment, a case of using a photosensor that performs the nozzle inspection by interrupting a light path will be described. As another example of the nozzle inspection unit 3, it may have a configuration for performing the nozzle check by confirming a state of an ejection target unit after having ejected the ink to a test ejection region. However, in a case of setting a distance between the nozzle inspection unit 3 and a surface of the head 1 for ejecting the ink substantially constant when the head 1 or the supporting stage 10 moves in a Z direction to prevent an error caused by the head 1 or the supporting stage 10 moving in the Z direction from occurring, the photosensor is more preferable.

Further, the inspection by the nozzle inspection unit 3 is controlled by the nozzle inspection controller 4. It receives signals indicating instructions based on when and which nozzle 6 is to be inspected from the nozzle inspection controller 4, and performs the inspection based on this instruction.

(Nozzle Inspection Controller 4)

The nozzle inspection controller 4 is for controlling the inspection by the nozzle inspection unit 3. Specifically, it performs control to perform the inspection on a nozzle 6 before forming a unit layer that uses the ink ejected from the nozzle 6 being an inspection target, or after having formed a unit layer that is located directly below the aforementioned unit layer. By inspecting the nozzle 6 just before using it, an ejection failure in the nozzle 6 with a low frequency of use can more effectively be spotted.

In the present embodiment, a configuration in which the inspection by the nozzle inspection unit 3 is controlled by a control means installed in the printing apparatus 100 is described; however, the disclosure is not limited to such a configuration, and may perform an inspection at every predetermined timing by manually operating the printing apparatus.

(Cleaning Unit 5)

The cleaning unit 5 is for cleaning the nozzles 6. It is configured of a wiper (not illustrated) for wiping the surface of the head 1 on which the nozzles 6 are formed, and a suction device (not illustrated) for suctioning the ink in the nozzles 6.

(Position Controller 30)

The position controller 30 is for controlling a difference in the distance between the nozzle inspection unit 3 and the ink ejection surface of the head 1 to be within a preset length even in a case where the head 1 moves.

Specifically, the position controller 30 detects a position of a Z-axis direction of the head, identifies a displacement from a position of a Z-axis direction of the nozzle inspection unit 3, and performs control to move the head 1 or the maintenance mechanism 20 in the Z-axis direction so that this displacement is cancelled upon the inspection. After having moved the position of the head 1 in the Z-axis direction just before the inspection, the nozzle inspection is performed by moving the head 1 to the maintenance mechanism 20.

It should be noted that the position controller 30 does not need to be provided if the nozzle inspection unit 3 is provided at an extended portion of a head supporting unit (not illustrated) that movably supports the head 1 in the X direction and the position of the nozzle inspection unit 3 relative to the head 1 is fixed. This is because it means that the position of the nozzle inspection unit 3 relative to the ink ejection surface is fixed, and further a distance between a position of ink when the nozzle inspection unit 3 inspects the ink and the ejection surface for this ink is maintained constant.

Further, the position controller 30 used in the production method of a three-dimensional shaped object according to the disclosure simply needs to be able to perform control so that at least one of the nozzle inspection unit 3, the supporting stage 10, and the head 1 is made to be movable in the laminating direction, and the difference in the distance between the head 1 and the nozzle inspection unit 3 stays within the preset length.

(Supporting Stage 10)

The supporting stage 10 is a stage for supporting the three-dimensional shaped object to be formed.

In the present embodiment, a case of fixing the supporting stage 10 and moving the head 1 in the sub scanning direction being the Y direction and the Z direction will be described; however, in a production apparatus of a three-dimensional shaped object according to the disclosure, the head 1 and the ejection target unit simply need to move relatively. Further, the supporting stage may be moved in the sub scanning direction being the Y direction each time a main scan by the head 1 is completed, and the supporting stage may be moved in a direction directed vertically downward each time a unit layer is formed.

[Method of Inspecting Nozzles while Producing Three-Dimensional Shaped Object M]

Next, a method of inspecting the nozzles 6 while producing the three-dimensional shaped object M will be described.

Prior to starting printing, the head 1 is housed in the maintenance mechanism 20.

When print start, which is a start of production of the three-dimensional shaped object M, is identified, the nozzle inspection controller 4 identifies the nozzles 6 to be used for forming a unit layer L1 next. A method of identifying the nozzles 6 may be a method in which the nozzle inspection controller 4 itself creates data indicating which nozzle 6 is used at what timing to eject the ink from image data of the three-dimensional shaped object M, or a method in which the nozzles 6 to be used for forming the unit layer L1 are identified by acquiring data created by hardware which has another printing software installed therein.

It should be noted that the nozzle inspection controller 4 identifies the start of printing as follows. That is, it identifies the start of printing when a user inputs an instruction to start production to an input unit (not illustrated) and this instruction is received. Further, in a case where one starting instruction instructs to produce plural types of three-dimensional shaped objects M, it may identify a timing when the type of the three-dimensional shaped object M to be produced changes as the start of printing.

The nozzle inspection controller 4 sends an instruction to the nozzle inspection unit 3 to inspect the nozzles 6 to be used for forming the unit layers L1, and nozzles 6 included in the same nozzle row as the aforementioned nozzles 6. With such a configuration, the inspection can be performed efficiently for every nozzle 6 that ejects the same type of ink even if a total ejection amount and a frequency of use differ greatly depending on the types of ink. It should be noted that in the production method of a three-dimensional shaped object according to the disclosure, the nozzles 6 may not be inspected in each nozzle row, and only the nozzles 6 used for forming a particular unit layer need to be inspected.

The nozzle inspection unit 3 inspects the nozzles 6 based on an instruction from the nozzle inspection controller 4. Specifically, it determines an ink ejection based on whether or not a light sensor is optically interrupted. The nozzle inspection unit 3 sends a measurement result to the nozzle inspection controller 4. The nozzle inspection controller 4 identifies a nozzle of which ejection amount is zero or does not satisfy a preset volume although it is not zero within a preset time period as an ejection-failed nozzle. It should be noted that the preset time period and the preset amount are stored in a recording unit (not illustrated), and the nozzle inspection controller 4 reads information on the time period and the amount from the recording unit for use in the determination of ejection-failed nozzles.

In a case where a nozzle 6 identified as the ejection-failed nozzle exists, formation of the unit layer L1 is started while suppressing an influence of this nozzle. Various methods may be considered as a method of suppressing the influence. The surface on which the nozzle 6 is formed may be wiped by the cleaning unit 5, after which the ink in the nozzle 6 may be removed by flushing that causes a small amount of ink to be ejected from the nozzle 6 or suction thereof. Due to this, thickening in the ejection-failed nozzle can be suppressed.

Further, in a case where an ejection-failed nozzle is identified in subsequent and oncoming inspections, from a viewpoint of shortening production time, the ejection amount from the nozzles 6 per one ejection may be reduced by increasing a number of scans necessary for forming an image of a unit area. More specifically, the influence of the ejection-failed nozzle can be suppressed by printing in a multi-pass scheme or increasing a pass number of the multi-pass.

Next, the ink is ejected while scanning the head 1 in the X direction. At this occasion, since the UV-LED lamp 2 is adjacent to the head 1, the UV-LED lamp 2 also moves similarly to the head 1.

The ink ejected from the head 1 is irradiated with ultraviolet light emitted from the UV-LED lamp 2. Due to this, the ejected ink is cured.

Next, the head 1 is moved in the Y direction every time the scan of the head 1 is performed.

A moving distance of the head 1 is at a same distance as a length of the nozzle rows 6-1, 6-2, . . . , being the ink ejection range of the head 1 in the sub scanning direction being the Y direction. That is, in the present embodiment, a case of a single-pass will be described. In the single-pass, a unit image region being a printing region having four sides with unit lengths is formed in one main scan. It should be noted that the disclosure is not limited to the single-pass, and may be implemented in a multi-pass scheme as well. That is, the single moving distance of the head 1 in the sub scanning direction being the Y direction is shorter than the length of the nozzle rows 6-1, 6-2, . . . in the sub scanning direction being the Y direction, being the ink ejection range of the head 1. Due to this, plural times of main scans are performed to print the unit image region.

As above, the formation of the unit layer L1 is completed by causing the head 1 to scan in the X direction and moving it in the Y direction.

Next, the nozzle inspection controller 4 sends an instruction to the nozzle inspection unit 3 to inspect the nozzles 6 to be used in forming the unit layer L2 and the nozzles 6 included in the same nozzle row as the aforementioned nozzles 6.

As above, in the production method of a three-dimensional shaped object according to the disclosure, control may be performed so that a nozzle 6 that is to eject ink for the first time since the start of the production is inspected prior to forming a unit layer that uses this ink. Which nozzle 6 corresponds to the aforementioned nozzle 6 can be identified from the aforementioned data indicating which nozzle 6 is used at what timing to eject the ink. According to such a control, a number of the nozzles 6 to be inspected can be reduced by inspecting only the nozzles 6 that have not been used for unit layers formed prior to a particular unit layer and will be used for the first time in forming the particular unit layer. As a result, the inspection time of the nozzles 6 can be shortened, and time before forming a subsequent unit layer can be shortened.

Prior to performing the inspection of the nozzles, the position controller 30 controls the position of the nozzle inspection unit 3 so that the difference in the distance between the nozzle inspection unit 3 and the ink ejection surface of the head 1 comes to be within the preset length. Further, the position of the head 1 is also moved in the Z direction. According to such a control, the distance between the nozzle inspection unit 3 and the surface of the head 1 for ejecting the ink can be maintained substantially constant even if the head 1 moves in the Z direction to laminate the unit layers. According to the above, the distance between the position of the ink when the nozzle inspection unit 3 inspects the ink and the ejection surface of this ink is maintained constant at all times, and as such, an influence imposed on the inspection by the movement of the head 1 in the Z direction can be suppressed. The "preset length" can suitably be set based on a thickness of the layers. Further, information indicating the "preset length" is stored in the recording unit (not illustrated), and the position controller 30 reads this information.

It should be noted that in the present embodiment, a configuration is explained in which the position controller 30 adjusts relative positions of the head 1 and the nozzle inspection unit 3 by moving the head 1 in the Z direction; however, the disclosure is not limited hereto. For example, the adjustment may be made by moving the supporting stage 10 and/or the nozzle inspection unit 3.

Next, the head 1 is moved in the Z direction to form the unit layer L2.

The unit layer L2 is formed by causing the head 1 to scan in the X direction and moving it in the Y direction, similarly to the unit layer L1.

Similarly, unit layers are laminated one after another in the Z direction. At this occasion, the inspection is performed on the nozzles 6 for the ink to be used in forming a unit layer to be laminated next after having formed the particular unit layer and other nozzles 6 in the nozzle row including the aforementioned nozzles 6 as the inspection target.

Further, in the present embodiment, an inspection to be described below is performed in addition to the inspection that has been described above.

That is, the nozzle inspection controller 4 controls the nozzle inspection unit 3 to inspect the nozzles 6 that have not performed ink ejection by a preset number of times and the nozzles 6 that have not performed ink ejection by a preset amount during the formation of a preset number of unit layers. According to such a control, even if a nozzle 6 with a small frequency of use becomes ejection-failed, such a failure can be detected.

The "preset number", the "preset number of times", and the "preset amount" can suitably be set based on a tendency of the ink to become thickened or on a size of the unit layers, and they may be changed depending on a type of the ink. Further, information indicating the "preset number", the "preset number of times", and the "preset amount" is stored in the recording unit (not illustrated), and the nozzle inspection controller 4 reads this information.

It should be noted that in the production method of a three-dimensional shaped object according to the disclosure, the nozzle inspection unit 3 may be controlled to inspect a nozzle 6 that does not satisfy the aforementioned conditions within a preset time period. For example, a nozzle 6 that does not eject a predetermined amount of ink or does not perform the ejection for a preset number of times may be inspected every one hour.

Further, independently from the aforementioned inspections, the inspection on the nozzle row 6-1 is performed after having formed a preset number of unit layers, and further, after having performed the inspection on the nozzle row 6-1, the inspection on the nozzle row 6-2 is performed after having formed a preset number of unit layers.

Similarly, the inspection is performed for all the nozzle rows. Accordingly, the inspection is performed for each nozzle row in an order of 6-1, 6-2, . . . per layer. Due to this, by dividing them into plural groups and performing the inspection in group units, a more precise three-dimensional shaped object can be produced. Further, in a case of inspecting all the nozzles every time a certain number of unit layers are formed, a state of a surface of the unit layer that has been formed immediately before differs from states of surfaces of the unit layers that were formed before in terms of their drying states and wettability. This is because time period before a subsequent unit layer is to be formed on the surface differs by a time period during which the nozzle inspection has been performed.

Thus, according to this embodiment, since the inspection is performed in group units, the time period until the formation of the subsequent unit layer can be shortened. Further, by performing the inspection every time certain layers are formed, the time period from when the particular unit layer has been formed until the subsequent unit layer is formed can be uniformized throughout a period for producing the three-dimensional shaped object M.

Group information being information indicating which nozzle 6 belongs to which group is stored in the recording unit (not illustrated) in advance, and the nozzle inspection controller 4 receives this information from the recording unit.

In the present embodiment, grouping in nozzle row units has been performed, and the inspection has been performed orderly for each nozzle row; however, the grouping does not have to be in the nozzle row units. Further, the nozzle rows may be divided in further detail. Further, one or a plurality of nozzle rows may be divided into an upstream side and a downstream side in the sub scanning direction to inspect the nozzle rows in the upstream side before the formation of the particular unit layer and to inspect the nozzle rows in the downstream side before the formation of another unit layer.

Further, the production apparatus of a three-dimensional shaped object according to the disclosure is not limited to a configuration that performs grouping and performs the inspection for each group as in the present embodiment. It may perform inspection for at least a part of preset nozzles 6 every time a preset number of unit layers are formed, or every time a preset time elapses. Nozzles (group thereof) with the low frequency of use may be selected in advance, and the nozzle check may be repeated at predetermined timings.

It should be noted that the method of inspecting the nozzles 6 while producing the three-dimensional shaped object M as described in the present embodiment is also an embodiment of a production apparatus of a three-dimensional shaped object according to the disclosure.

(Software-Implemented Example)

Control blocks of the nozzle inspection controller 4 and the position controller 30 may be implemented by logic circuits that are hardware formed on an integrated circuit (IC chip: Integrated Circuit), or may be implemented by software using a CPU (Central Processing Unit).

In a latter case, the nozzle inspection controller 4 and the position controller 30 include the CPU that executes instructions of a program, which is the software for realizing respective functions, a ROM (Read Only Memory) or a storage device which is termed a recording medium on which the program and various data are recorded in a computer or CPU-readable manner, and a RAM (Random Access Memory) for expanding the program, and the like. The purpose of the disclosure is achieved by the computer (or the CPU) reading the program from the recording medium and executing it. As the recording medium, a "non-volatile and tangible medium", such as a tape, a disk, a card, a semiconductor memory, a programmable logic circuit, and the like may be used. Further, the program may be provided to the computer via an arbitrary transmission medium that can transmit the program, such as a communication network, a broadcast waves, and the like. It should be noted that the disclosure may be implemented alternatively in an embodiment of data signals embedded in carrier waves, in which the program is implemented by electronic transmission.

<Supplemental Notes>

As above, an embodiment of the production method of a three-dimensional shaped object according to the disclosure is the production method of the three-dimensional shaped object M in which the unit layers L1, L2, and the like are laminated, where each of the unit layers L1, L2, and the like is formed by ink ejected from the nozzles 6 provided in the head 1, the method includes a nozzle checking step of inspecting the nozzles 6, the nozzle checking step includes performing a nozzle check on at least a part of the nozzles 6 that eject the ink for forming a particular unit layer as an inspection target, the nozzle check is performed after having started production in a case where a timing of the nozzle check is before forming the unit layer and the unit layer is a lowermost layer, and is performed after having formed a unit layer that is located directly under the unit layer in a case where the timing of the nozzle check is before forming the unit layer and the unit layer is not the lowermost layer.

Further, an embodiment of the production apparatus of a three-dimensional shaped object according to the disclosure is the printing apparatus 100 for a three-dimensional shaped object M that laminates unit layers L1, L2, and the like, each of the unit layers being formed by ink ejected from nozzles 6 provided in a head 1, the apparatus including: a nozzle inspection unit 3 configured to inspect the nozzles 6 and a nozzle inspection controller 4 configured to control the nozzle inspection unit 3, the nozzle inspection controller 4 performs control to perform a nozzle check on at least a part of the nozzles 6 among the nozzles 6 that eject the ink for forming a particular unit layer as an inspection target, the nozzle check is performed after having started production in a case where a timing of the nozzle check is before forming the unit layer and the unit layer is a lowermost layer, and is performed after having formed a unit layer that is located directly under the unit layer in a case where the timing of the nozzle check is before forming the unit layer and the unit layer is not the lowermost layer.

According to the above configuration, when the three-dimensional shaped object M is to be produced, the inspection can be performed for each nozzle 6 that ejects the ink at timings closer to immediately before when the nozzle 6 is to be used. Due to this, an influence of occurrences of abnormal nozzles caused by a difference in their frequency of use can effectively be detected. As above, the nozzle check suitable for the production of the three-dimensional shaped object M can be performed.

Further, an embodiment of the production method of a three-dimensional shaped object according to the disclosure includes nozzle rows 6-1, 6-2, ... in each of which one or more the nozzles 6 are arranged along a certain direction, a type of the ink to be ejected is different for each of the nozzle rows 6-1, 6-2, ..., and the nozzle checking step performs the nozzle check of one of the nozzle rows 6-1, 6-2, ... including the nozzle 6 that is the inspection target.

According to the above configuration, even if an ejection amount and frequency of use differ greatly among the nozzle rows 6-1, 6-2, ..., an occurrence of failure in the nozzles 6 caused by an influence thereof can effectively be detected.

Further, in an embodiment of the production method of a three-dimensional shaped object according to the disclosure, in the nozzle checking step, the nozzle check may be performed on a nozzle 6 that is to be used for a first time after having started the production in forming a particular unit layer as the inspection target.

According to the above configuration, by inspecting only the nozzles 6 that have not been used for unit layers formed prior to a particular unit layer and will be used for the first time in forming the particular unit layer, a number of the nozzles 6 to be inspected can be reduced. As a result, inspection time of the nozzles 6 can be shortened, and time before forming a subsequent unit layer can be shortened.

Further, in an embodiment of the production method of a three-dimensional shaped object according to the disclosure, in the nozzle checking step, at least a preset part of the nozzles 6 provided in the head 1 are subjected to the nozzle check at least in one of occasions, which are every time a preset number of unit layers are formed and in a preset time.

According to the above configuration, the nozzle check is performed periodically, so that even if an ejection failure occurs in a nozzle 6 after a previous inspection has been performed, such a failure can be detected.

Further, in an embodiment of the production method of a three-dimensional shaped object according to the disclosure, in the nozzle checking step, a preset plurality of nozzles 6 among the nozzles 6 provided in the head 1 are configured as one group, and based on group information that divides at least a part of the nozzles 6 provided in the head 1 into a nozzle row 6-1, a nozzle row 6-2, ..., which are a plurality of groups, the nozzle check of a part of the plurality of groups is performed every time a preset number of unit layers are formed.

According to the above configuration, the nozzle check is performed by group divisions, so that the time until forming the subsequent unit layer can be shortened. Due to this, the time from when a particular unit layer has been formed until forming the subsequent unit layer can further be uniformized throughout a period for producing the three-dimensional shaped object M. Due to this, the surfaces of the unit layers can be brought to a more uniformized state to form their subsequent layers, and a highly precise three-dimensional shaped object M can be produced.

Further, in an embodiment of the production method of a three-dimensional shaped object according to the disclosure, in the nozzle checking step, at least one of a nozzle 6 that has not ejected the ink for a preset number of times and a nozzle 6 that has not ejected the ink at a preset amount within a period until forming a preset number of unit layers after having formed a particular unit layer or within a preset time is subjected to the nozzle check and/or flushing.

According to the above configuration, by performing the nozzle check on the nozzle 6 with the nonfrequent operating state, even if this nozzle 6 is in the non-ejectable state, such state of the nozzle 6 not being able to eject can be identified.

Since an occurrence of an abnormal nozzle 6 is less for a nozzle 6 with a frequent operating state, the inspection time for the nozzles 6 can be shortened by performing the check only on the nozzle 6 with the nonfrequent operating state. Further, by performing the flushing on the nozzle 6 with the nonfrequent operating state, thickening in this nozzle 6 can be suppressed.

Further, an embodiment of the production apparatus of a three-dimensional shaped object according to the disclosure further includes a supporting stage 10 that supports a three-dimensional shaped object M, and a position controller 30 that enables at least one of a nozzle inspection unit 3, the supporting stage 10, and a head 1 to move in the Z direction, where the position controller 30 performs control such that a difference in a distance between the nozzle inspection unit 3 and an ink ejection surface of the head 1 stays within a preset length even in a case where at least one of the supporting stage 10 and the head 1 moves in the Z direction.

According to the above configuration, even if the head 1 or the supporting stage 10 moves in the Z direction, the distance between the nozzle inspection unit 3 and the surface of the head 1 for ejecting the ink stays substantially constant, as a result of which a distance from the nozzle inspection unit 3 to a region where the ink ejected from the ink ejection surface of the head 1 is detected becomes substantially constant at all times. Thus, an error in the nozzle inspection caused by the head 1 or the supporting stage 10 moving in the Z direction does not occur.

INDUSTRIAL APPLICABILITY

The disclosure can be used for production of a three-dimensional shaped object.

The invention claimed is:

1. A production method of a three-dimensional shaped object configured to laminate unit layers by an inkjet method using ultraviolet curing ink,
  each of the unit layers being formed by curing droplets of the ultraviolet curing ink ejected from nozzles provided in a head which is configured to move in a scanning direction, and the droplets is irradiated with ultraviolet light by an ultraviolet light source while the ultraviolet light source moving in the scanning direction together with the head, the production method of the three-dimensional shaped object comprising
  a nozzle checking step of inspecting the nozzles,
  wherein a preset plurality of nozzles among the nozzles provided in the head is configured as one group, and based on group information related to a plurality of groups, the nozzle checking step performs a nozzle check of a part of the plurality of groups, and
  the nozzle checking step is controlled to perform the nozzle check for the plurality of groups that includes the nozzle that has not ejected the droplets for a preset number of times and/or the nozzle that has not ejected the droplets at a preset amount after having formed a particular unit layer within a preset time,
  wherein at least a part of the nozzles provided in the head is divided into a plurality of groups as the group information,
  the nozzle check of a part of the plurality of groups is performed every time a preset number of unit layers are formed based on the group information,
  wherein the nozzle check is performed by a nozzle inspection unit, and before the nozzle checking step is performed, the nozzle inspection unit or the head is moved in a laminating direction to adjust a displacement between the head and the nozzle inspection unit.

2. The production method of a three-dimensional shaped object according to claim 1, wherein
nozzle rows in each of which one or more of the nozzles are arranged along a certain direction are provided,
a type of the droplets to be ejected is different for each of the nozzle rows, and
the nozzle checking step performs the nozzle check of a nozzle row including a nozzle that is the inspection target.

3. The production method of a three-dimensional shaped object according to claim 1, wherein, in the nozzle checking step, the nozzle check is performed on a nozzle that is to be used for a first time after having started the production in forming the particular unit layer as the inspection target.

4. The production method of a three-dimensional shaped object according to claim 1, wherein in the nozzle checking step, at least a preset part of the nozzles provided in the head are subjected to the nozzle check at least in one of occasions, which are every time a preset number of unit layers are formed, and in a preset time.

5. A production apparatus of a three-dimensional shaped object configured to laminate unit layers by an inkjet method using ultraviolet curing ink,
each of the unit layers being formed by curing droplets of the ultraviolet curing ink ejected from nozzles provided in a head, the production apparatus of the three-dimensional shaped object comprising:
a nozzle inspection unit configured to inspect the nozzles;
a nozzle check controller configured to control the nozzle inspection unit;
the head comprising the nozzles for ejecting the droplets of the ultraviolet curing ink and configured to move in a scanning direction; and
an ultraviolet light source configured to irradiate the droplets with ultraviolet light while moving in the scanning direction together with the head,
wherein a preset plurality of nozzles among the nozzles provided in the head is configured as one group, and based on group information related to a plurality of groups, the nozzle check controller performs a nozzle check of a part of the plurality of groups, and
the nozzle check controller controls performing the nozzle check for the plurality of groups that includes the nozzle that has not ejected the droplets for a preset number of times and/or the nozzle that has not ejected the droplets at a preset amount after having formed a particular unit layer within a preset time,
wherein at least a part of the nozzles provided in the head is divided into a plurality of groups as the group information,
the nozzle check of a part of the plurality of groups is performed every time a preset number of unit layers are formed based on the group information,
wherein a position controller is provided for controlling a distance between the nozzle inspection unit and a droplet ejection surface of the head in the laminating direction, and
the position controller enables the nozzle inspection unit or the head to move in the laminating direction to adjust a displacement between the head and the nozzle inspection unit.

6. The production apparatus of a three-dimensional shaped object according to claim 5, further comprising:
a supporting stage that supports the three-dimensional shaped object,
wherein the position controller enables at least one of the nozzle inspection unit, the supporting stage, and the head to move in the laminating direction,
wherein the position controller performs control such that a difference in the distance between the nozzle inspection unit and the droplet ejection surface of the head stays within a preset length even in a case where at least one of the supporting stage and the head moves in the laminating direction.

* * * * *